United States Patent
Jin

(10) Patent No.: US 10,088,934 B2
(45) Date of Patent: *Oct. 2, 2018

(54) ARRAY SUBSTRATE AND DISPLAY PANEL

(71) Applicants: Shanghai AVIC OPTO Electronics Co., Ltd., Shanghai (CN); Tianma Micro-Electronics Co., Ltd., Shenzhen (CN)

(72) Inventor: Huijun Jin, Shanghai (CN)

(73) Assignees: SHANGHAI AVIC OPTO ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/926,488

(22) Filed: Mar. 20, 2018

(65) Prior Publication Data

US 2018/0210592 A1    Jul. 26, 2018

Related U.S. Application Data

(63) Continuation of application No. 15/799,134, filed on Oct. 31, 2017, now Pat. No. 9,958,978, which is a
(Continued)

(30) Foreign Application Priority Data

Apr. 1, 2015 (CN) .......................... 2015 1 0152677

(51) Int. Cl.
*G06F 3/041* (2006.01)
*G06F 3/044* (2006.01)
*G09G 3/00* (2006.01)

(52) U.S. Cl.
CPC ............ *G06F 3/0412* (2013.01); *G06F 3/044* (2013.01); *G06F 3/0416* (2013.01); *G09G 3/00* (2013.01)

(58) Field of Classification Search
CPC ........... G02F 1/13338; G02F 1/133345; G02F 1/134309; G02F 2001/133776; G06F 3/0412; G06F 3/044; G06F 3/0416
See application file for complete search history.

(56) References Cited

U.S. PATENT DOCUMENTS

2013/0033439 A1*  2/2013  Kim .................... G02F 1/13338
                                                                345/173
2013/0038590 A1*  2/2013  Yamada ............ G02F 1/136213
                                                                345/211

(Continued)

*Primary Examiner* — Gerald Johnson
(74) *Attorney, Agent, or Firm* — Alston & Bird LLP

(57) ABSTRACT

Array substrate and display panel are provided. The array substrate includes: common electrodes, first and second signal lines, wherein a common electrode insulated from the first signal line has a first slit in a part facing the first signal line, a common electrode insulated from the second signal line has a second slit in a part facing the second signal line, distance between the driver chip and a common electrode connected with the first signal line is greater than that between the driver chip and a common electrode connected with the second signal line, there are first deviation between width bisector of projection of the first signal line and width bisector of the first slit and second deviation between width bisector of projection of the second signal line and width bisector of the second slit, the first deviation is smaller than the second deviation. Display and touch performance are improved.

12 Claims, 7 Drawing Sheets

Related U.S. Application Data continuation of application No. 14/979,006, filed on Dec. 22, 2015, now Pat. No. 9,830,008.

(56) References Cited

U.S. PATENT DOCUMENTS

| | | | |
|---|---|---|---|
| 2014/0285478 A1* | 9/2014 | Ono | G09G 3/3614 345/209 |
| 2015/0189261 A1* | 7/2015 | Kaneko | G02F 1/1333 348/57 |
| 2015/0378390 A1* | 12/2015 | Liu | G06F 3/0412 345/173 |
| 2016/0041665 A1* | 2/2016 | Gwon | G06F 3/044 345/174 |
| 2016/0224155 A1* | 8/2016 | Kim | G06F 3/044 |

* cited by examiner

ARRAY SUBSTRATE AND DISPLAY PANEL

CROSS-REFERENCE TO RELATED APPLICATIONS

The present application is a continuation application of the U.S. patent application Ser. No. 15/799,134 which is a continuation application of the U.S. patent application Ser. No. 14/979,006 claiming priority to Chinese patent application No. CN201510152677.1, filed with the State Intellectual Patent Office of the People's Republic of China on Apr. 1, 2015, and entitled "ARRAY SUBSTRATE AND DISPLAY PANEL", the entire disclosure of which is incorporated herein by reference.

TECHNICAL FIELD OF THE INVENTION

The present disclosure generally relates to display technology, an array substrate, and a display panel.

BACKGROUND OF THE INVENTION

Liquid Crystal Display (LCD) and Organic Light-Emitting Diode (OLED) displays have advantages of low radiation, small size, low power consumption, etc. Therefore, LCD and the OLED displays have been widely used in notebook computers, Personal Digital Assistants (PDAs), flat-screen TVs, mobile phones and other products.

Products integrating touch technology with display technology have gradually spread into people's lives. Currently, touch screens can be classified as out-cell touch screen, surface-covering touch screen, or in-cell touch screen according to their structures. In the in-cell touch screen, touch electrodes of the touch screen are embedded inside a display panel, so that an overall thickness of the module can be reduced, and manufacturing cost of the touch screen can be reduced. Conventional in-cell capacitive touch screens detect a finger touch position based on a mutual capacitance principle or a self capacitance principle. In the self capacitance principle, a plurality of self-capacitance electrodes, which are insulated from each other, are disposed in a same layer. When the touch screen is not touched, each self-capacitance electrode is applied with a constant capacitance, and when the touch screen is touched, the corresponding self-capacitance electrode is applied with the constant capacitance superimposed with a body capacitance. A touch detection chip is used to detect capacitance change of each self-capacitance electrode, so as to detect a touched position.

With the increase of the display panel size, lengths of signal lines used in the touch display panel are increased. Therefore, resistances and capacitances of the signal lines increase, and differences of the resistances and capacitances between different signal lines increase, which results an increase of RC delay of the display panel, where R represents resistance, C represents capacitance, and RC represents a product of the resistance and the capacitance. The increase of the RC delay further results degradation of display performance and touch performance.

SUMMARY OF THE INVENTION

In order to improve display performance and touch performance of the conventional display panel, an array substrate and a display panel are provided.

According to one aspect of the present disclosure, an array substrate is provided. The array substrate includes a plurality of common electrodes insulated from each other; and a plurality of signal lines comprising a first signal line and a second signal line, wherein the first signal line and the second signal line are respectively electrically connected with one of the plurality of common electrodes, and are electrically connected with a driving chip; the first signal line is insulated from common electrodes which are not electrically connected with the first signal line, and the second signal line is insulated from common electrodes which are not electrically connected with the second signal line; a first common electrode insulated from the first signal line has a first slit in a part facing to the first signal line; a second common electrode insulated from the second signal line has a second slit in a part facing to the second signal line; a distance between the driver chip and a third common electrode electrically connected with the first signal line is greater than a distance between the driver chip and a fourth common electrode electrically connected with the second signal line; there is a first deviation between a width bisector of a projection of the first signal line in a plane of the plurality of common electrodes and a width bisector of the first slit; there is a second deviation between a width bisector of a projection of the second signal line in the plane of the plurality of common electrodes and a width bisector of the second slit; and the first deviation is smaller than the second deviation According to another aspect of the present disclosure, a display panel is provided. The display panel includes the array substrate described above.

BRIEF DESCRIPTION OF THE DRAWINGS

In order to clarify the technical solution of the present disclosure, the figures used in the description of embodiments of the present disclosure will be briefly described. The figures only refer to preferred embodiments of the present disclosure, and various changes may be made by those skilled in the art without departing from the spirit or scope of this disclosure.

DETAILED DESCRIPTION OF THE INVENTION

Figure 1:
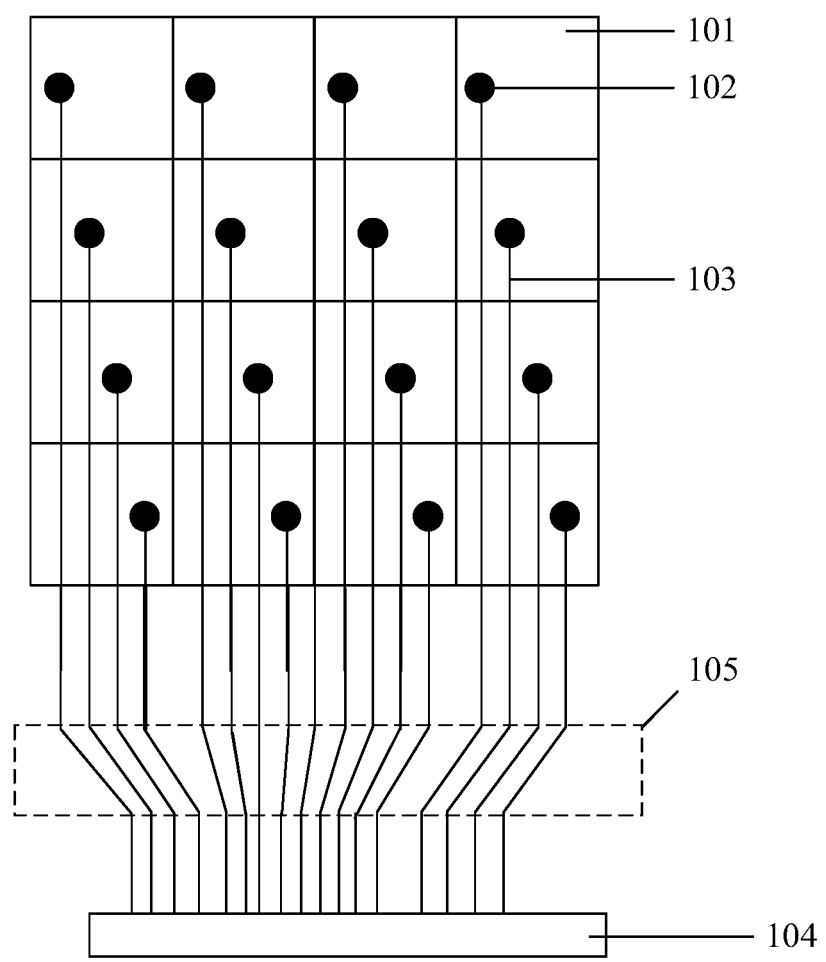
FIG. 1 schematically illustrates a diagram of an array substrate.

An array substrate is schematically illustrated in FIG. 1. The array substrate includes a common electrode layer (not shown), wherein the common electrode layer is divided into a plurality of common electrodes 101. Each common electrode 101 is insulated from one another. Each common electrode 101 is connected with a driving chip (IC) 104 through one signal line 103. Different signal lines 103 are insulated from each other, and each signal line 103 is electrically connected with a corresponding common electrode 101 through a via hole 102 in an insulator layer (not shown). When the display panel is in a display period, a same common voltage is applied to all the common electrodes 101, and when the display panel is in a touch period, a voltage signal for touch detection is applied to the common electrodes 101 which serve as self-capacitance touch electrodes.

In the array substrate, a width of the display area is always greater than a width of the driving chip 104 for connecting the signal lines 103. Therefore, the metal lines between the common electrodes 101 and the driving chip 104 always have a fanout area 105 (the fanout area is illustrated in a dashed box in FIG. 1).

There are two reasons which result in different lengths of different signal lines 103. First, distances between the driving chip 104 and different common electrodes 101 are different, so that different signal lines 103 in the display area have different lengths. Second, the different signal lines 103 have different bending structures in the fanout area 105. Moreover, the different lengths of the signal lines 103 may result in different resistances of the signal lines 103. Therefore, even though all capacitances between the signal lines 103 and the common electrodes 101 are the same, products of the capacitance and the resistance (RC) of the signal lines 103 are different. If different signal lines 103 have different RCs, noises may increase in a touch detection period, which may result in a reduction of the identification of detection signals. In worst cases, a touch may not be recognized at all. In addition, in the display period of the common electrodes 101, if RCs between different signal lines 103 are too large, voltages applied to different common electrodes 101 are not synchronized, which may result in problems such as uneven flicker, residual image, whitening of black image, etc.

In order to clarify the objects, characteristics, and advantages of the disclosure, the embodiments of the present disclosure will be described in detail in conjunction with the accompanying drawings.

An array substrate is provided in embodiments of the present disclosure. The array substrate includes a plurality of common electrodes, which are insulated from each other. The array substrate further includes a plurality of signal lines. Each of the plurality of common electrodes is electrically connected with one end of one of the plurality of signal lines, and the other end of the signal line is electrically connected with a driving chip (referring to FIG. 1).

In the embodiment shown in FIG. 1, the signal line is insulated from other common electrodes which are not electrically connected with it. Each common electrode has a slit in a part facing to the signal line which is insulated from it. Namely, each common electrode is electrically connected with one end of one touch signal line, and is insulated from other touch signal lines. Meanwhile, if one signal line is not electrically connected with one common electrode and the common electrode has a part facing to the signal line, the part of the common electrode facing to the signal line has a slit.

In the embodiment shown in FIG. 1, the common electrodes serve as display electrodes in a display period, and the common electrodes serve as self-capacitance touch electrodes in a touch detection period. When a display panel having the array substrate works in a display period, a common voltage is applied to all the common electrodes; and when the display panel having the array substrate works in a touch period, the common electrodes work as self-capacitance electrodes and voltages for touch detection are applied to the common electrodes.

Figure 2:
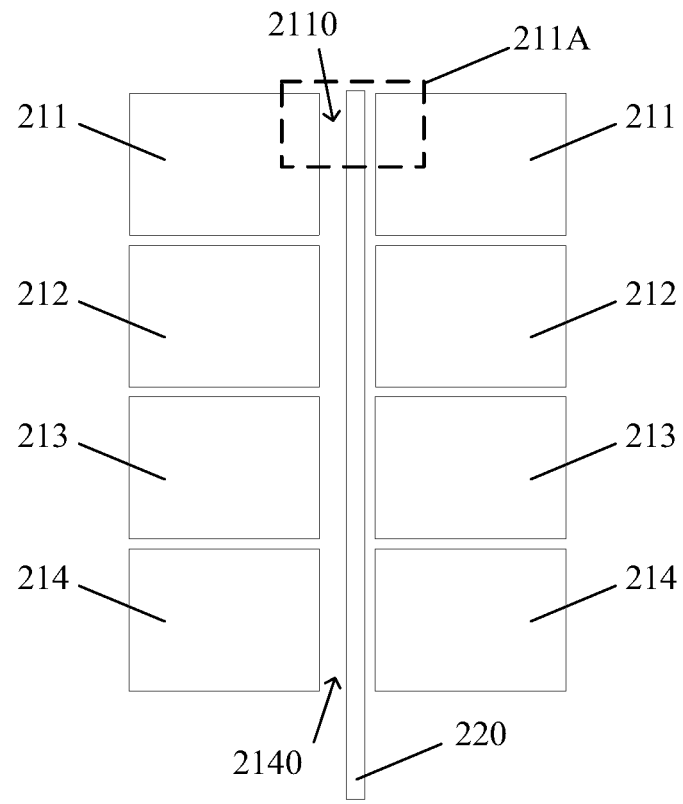
FIG. 2 schematically illustrates a diagram of an array substrate according to an embodiment of the present disclosure.

Referring to FIG. 2, a diagram of a part of an array substrate is illustrated according to one embodiment of the present disclosure. A common electrode 211, a common electrode 212, a common electrode 213, a common electrode 214, and a signal line 220 are illustrated in FIG. 2. A common electrode which is electrically connected with the signal line 220 is not shown in FIG. 2. The common electrode 211, the common electrode 212, the common electrode 213 and the common electrode 214 are insulated from the signal line 220. Therefore, as shown in FIG. 2, a part of each of the common electrode 211, the common electrode 212, the common electrode 213 and the common electrode 214, which is facing to the signal line 220, has a slit. The common electrode 211 has a slit 2110, the common electrode 214 has a slit 2140, and slits of the common electrode 212 and the common electrode 213 are not labeled in FIG. 2.

It should be noted that, the signal line 220 shown in FIG. 2 is a projection in a plane of the common electrodes. The common electrode 211, the common electrode 212, the common electrode 213 and the common electrode 214 are in a different layer from the signal line 220. Specifically, an insulator layer (not shown) is disposed between the common electrodes (211, 212, 213 and 214) and the signal line 220. The insulator layer can provide good insulation efficiency between them.

It should be noted that, each of the common electrodes in FIG. 2 has a left part and a right part on both sides of the slit, and a part for electrically connecting the left part and the right part is not shown in FIG. 2. However, the common electrode 211, which is illustrated as the left part and the right part in FIG. 2, is actually electrically connected as a whole. Namely, the slit doesn't separate the entire common electrode. For example, the common electrode 211 has a part (not shown) for connecting the two parts in FIG. 2.

Figure 3:
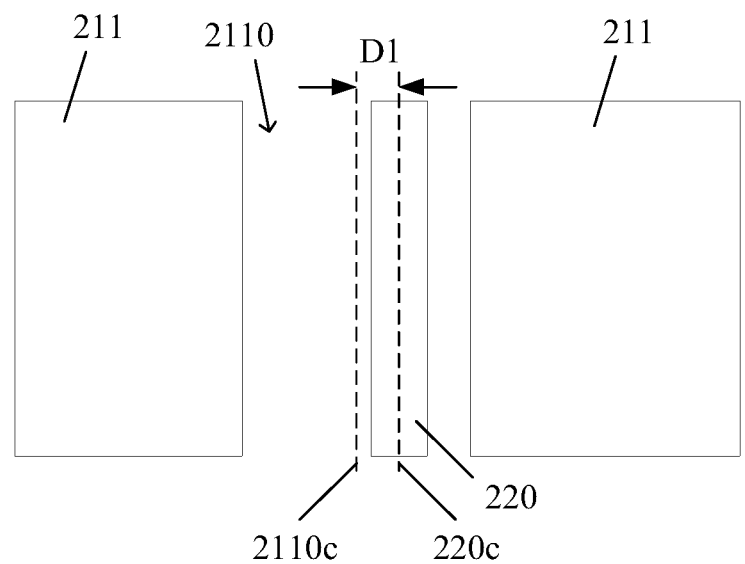
FIG. 3 schematically illustrates a partial enlarged view of the array substrate in FIG. 2.

Referring to FIG. 3, a partial enlarged view of a dashed box 211A shown in FIG. 2 is illustrated. A projection of the signal line 220 in the plane of the common electrodes is located in the slit 2110. In FIG. 3, a dashed line 220c is used to illustrate a width bisector of the projection, and a dashed line 2110c is used to illustrate a width bisector of the slit 2110. The two bisectors have a deviation D1 between them.

It should be noted that, a width of a component in this embodiment refers to a size of the component in the horizontal direction.

In one embodiment, if a signal line has a greater resistance, a projection of the signal line in the plane of the common electrodes may be closer to a middle position of the slit. Namely, if the signal line has a greater resistance, the deviation D1 is less.

By controlling the deviation D1, differences of RCs (R represents resistance, C represents capacitance, and RC represents a product of the resistance and the capacitance) of different signal lines can be reduced. If a signal line having a high resistance is not adjusted, the RC of the signal line may be great, and there may be a greater RC difference between this signal line and other signal lines. In one embodiment, there may be a signal line having a high resistance, and a position of a projection of the signal line in the plane of the common electrodes is adjusted to approach to a middle position of the slit of the common electrodes, so that a capacitance between the signal line and the common electrode is reduced. As a result, the RC of the signal line is reduced, differences between the signal line and other signal lines are reduced or even eliminated. Therefore, each signal line may have a same RC, so that the detected noises of the array substrate can be reduced in the touch detection period, uneven flicker, residual image, whitening of black images, and other display errors may also be reduced.

In the array substrate of the embodiment illustrated in FIG. 3, there are a first signal line having a large resistance and a second signal line having a small resistance. A common electrode insulated from the first signal line has a first slit on a side facing to the first signal line, and a common electrode insulated from the second signal has a second slit on a side facing to the second signal line. There is a first deviation between a projection of the first signal line in a plane of the common electrode and a middle position of the first slit, and there is a second deviation between a projection of the second signal line in the plane of the common electrodes and a middle position of the second slit. In this embodiment, it is made that the first deviation is smaller than the second deviation.

When the first deviation is smaller than the second deviation, a first capacitance between the first signal line and the common electrode is smaller than a second capacitance between the second signal line and the common electrode. Therefore, even though the resistance of the first signal line is greater than that of the second signal line, a difference between RCs of the first signal line and the second signal line may be little. Hence the detected noises of the array substrate can be reduced in the touch detection period, and the touch and display performances of a display panel having the array substrate can be improved.

In other embodiments of the present disclosure, another array substrate is provided. The array substrate includes: a plurality of common electrodes which are insulated from each other and a plurality of signal lines. Each of the plurality of electrodes is electrically connected with one end of one of the plurality of signal lines, and the other end of the signal line is electrically connected with a driving chip. The signal line is insulated from other common electrodes which are not electrically connected with the signal line. A common electrode has a slit in a part facing to the signal line which is insulated from it. There is a deviation between a projection of each of the plurality of signal lines in a plane of the common electrodes and a middle position of a corresponding slit. The greater the signal line resistance is, the less the corresponding deviation is.

Another array substrate is provided in another embodiment of the present disclosure. The array substrate includes a plurality of common electrodes which are insulated from each other. The array substrate further includes a plurality of signal lines. Each of the plurality of common electrodes is electrically connected with one end of one of the plurality of signal lines, and the other end of each signal line is electrically connected with a driving chip (referring to FIG. 1).

In one embodiment, the signal line is insulated from other common electrodes which are not electrically connected with it. A common electrode has a slit in a part facing to the signal line which is insulated from it. Each common electrode is only electrically connected with one of the plurality of signal lines, and is insulated from other signal lines. Meanwhile, if one signal line is not electrically connected with one common electrode and the common electrode has a part facing to the signal line, the part of the common electrode facing to the signal line has a slit.

In one embodiment, the common electrodes serve as display electrodes in a display period, and the common electrodes also serve as self-capacitance touch electrodes in a touch detection period. When a display panel having the array substrate works in a display period, a common voltage is applied to all the common electrodes; and when the display panel having the array substrate works in a touch period, the common electrodes work as self-capacitance electrodes and voltages for touch detection are applied to the common electrodes.

In one embodiment, the plurality of common electrodes are arranged in an array having M rows and N columns, wherein both M and N are integers greater than 1. For the M common electrodes in a same column, a kth common electrode is electrically connected with a kth signal line, wherein k is an integer between 1 and M.

Figure 4:
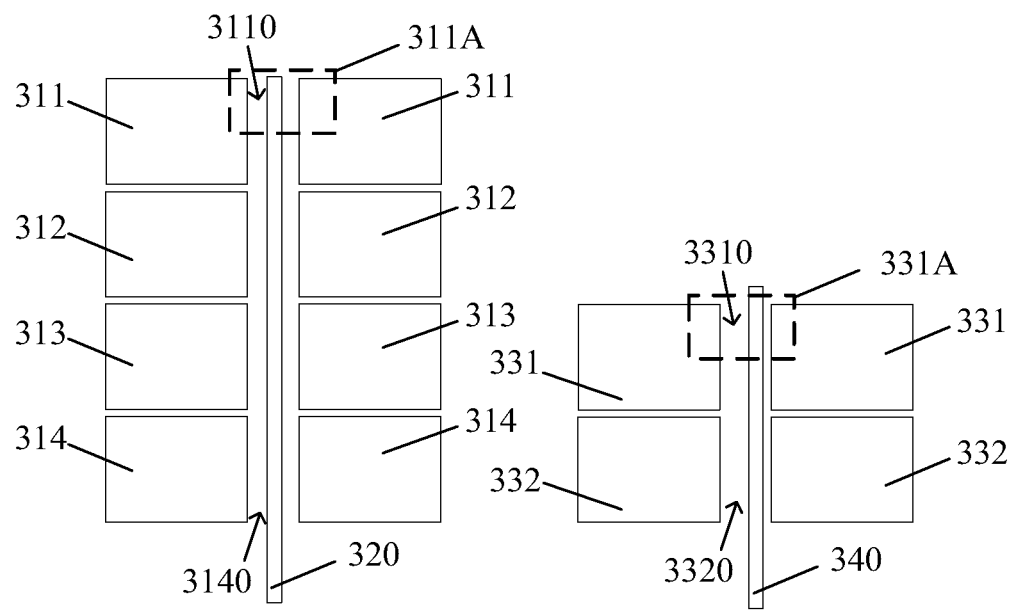
FIG. 4 schematically illustrates a diagram of an array substrate according to another embodiment of the present disclosure.

Referring to FIG. 4, a part of an array substrate of an embodiment is illustrated. FIG. 4 illustrates a plurality of common electrodes arranged in an array. The plurality of common electrodes includes a common electrode 311, a common electrode 312, a common electrode 313 and a common electrode 314. A signal line 320 is also illustrated in FIG. 4. A common electrode electrically connected with the signal line 320 is not shown. The common electrode 311, the common electrode 312, the common electrode 313 and the common electrode 314 are insulated from the signal line 320. Therefore, as shown in FIG. 4, a part of each of the common electrode 311, the common electrode 312, the common electrode 313 and the common electrode 314, which is facing to the signal line 320, has a slit. For example, the common electrode 311 has a slit 3110, the common electrode 314 has a slit 3140, and slits of the common electrode 312 and the common electrode 313 are not shown in FIG. 4.

FIG. 4 also illustrates a second plurality of common electrodes arranged in an array, which include a common electrode 331 and a common electrode 332. Meanwhile, a signal line 340 is also shown in FIG. 4. A common electrode electrically connected with the signal line 340 is not shown. The common electrode 331 and the common electrode 332 are insulated from the signal line 340. Therefore, as shown in FIG. 4, a part of each of the common electrode 331 and the common electrode 332, which is facing to the signal line 220, has a slit. For example, the common electrode 331 has a slit 3310, the common electrode 332 has a slit 3320.

It should be noted that, the signal line 320 and the signal line 340 shown in FIG. 4 are projections in the plane of the common electrodes. Although the common electrode and the signal line are electrically connected, they are in different layers. Specifically, an insulator layer (not shown) is disposed between the common electrodes and the signal line. The insulator layer can provide good insulation efficiency between the common electrodes and the signal line. The signal lines are electrically connected with the common electrodes through via holes in the insulator layer.

In one embodiment, the common electrode electrically connected with the signal line 320 is far away from the driving chip (referring to FIG. 1, the driving chip is disposed under the display area), while the common electrode electrically connected with the signal line 340 is near to the driving chip. Therefore, a length of the signal line 320 is greater than a length of the signal line 340, that is, a resistance of the signal line 320 is greater than a resistance of the signal line 340.

It should be noted that, each of the common electrodes in FIG. 4 has a left part and a right part on two sides of the slit, and a part for electrically connecting the left part and the right part is not shown in FIG. 4. However, each common electrode, which is illustrated as a left part and a right part in FIG. 4, is actually electrically connected as a whole. Namely, the slit doesn't separate the common electrode completely. For example, each common electrode in FIG. 4 has a part (not shown) for connecting the two parts.

In one embodiment, the further a common electrode is away from the driving chip, the closer the signal line electrically connected with the common electrode is located in relation to a middle position of the slit. Therefore, in this embodiment, the signal line 320 approaches closer to the middle position of the slit, while the signal line 340 is further away from the middle position of the slit. More detail about the reason refers to descriptions of above embodiments are described in relation to FIG. 5 and FIG. 6 hereunder.

In one embodiment, there is a first distance from the $k^{th}$ common electrode to one side of the slit, and there is a second distance from the $k^{th}$ common electrode to the other side of the slit. The closer the $k^{th}$ common electrode approaches to the driving chip, the greater a difference between the first distance and the second distance is.

Figure 5:
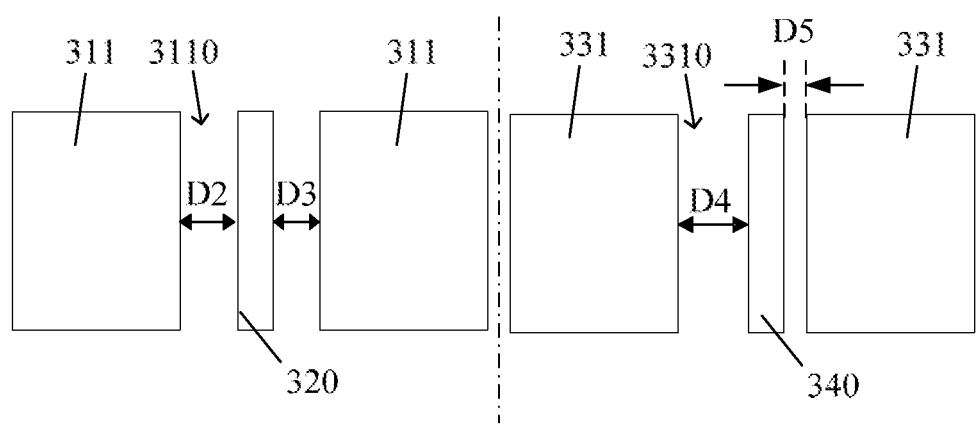
FIG. 5 schematically illustrates a partial enlarged view of the array substrate in FIG. 4.

Referring to FIG. 5, two partial enlarged views of a dashed box 311A and a dashed box 331A shown in FIG. 4 are illustrated, wherein the two enlarged views are separated by a dotted line. Two average distances from a projection of the signal line 320 in the common electrode plane to two sides of the slits 3110 are referred to as D2 and D3. Two average distances from a projection of the signal line 340 in the common electrode plane to two sides of the slits 3310 are referred to as D4 and D5.

It should be noted that, in this embodiment, the two sides of the slit refer to the two opposite sides in the horizontal direction shown in FIG. 5.

In this embodiment, by controlling the average distances D2, D3, D4 and D5, a difference between RCs of the signal line 320 and the signal line 340 are controlled.

Figure 6:
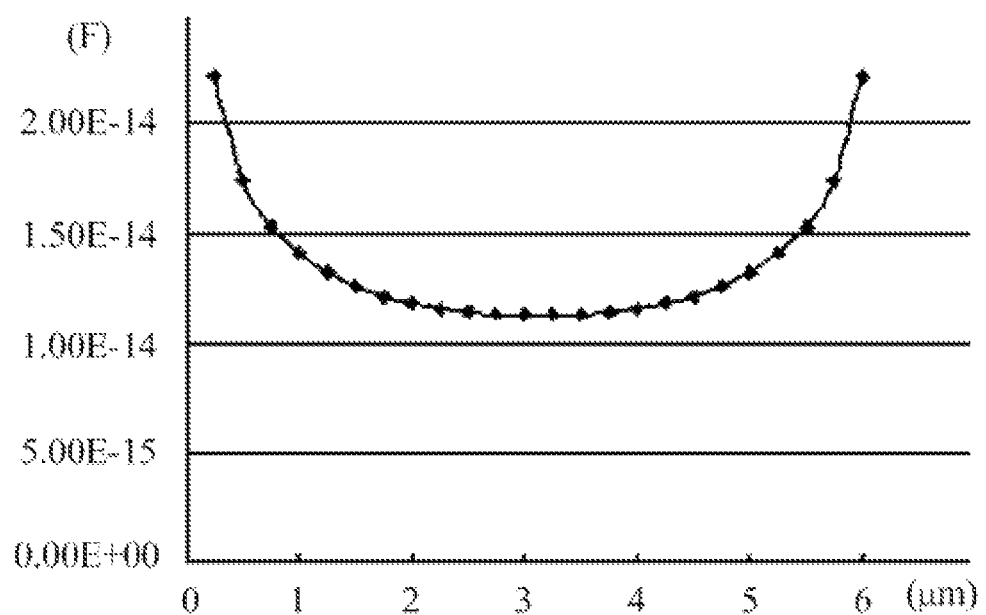
FIG. 6 schematically illustrates a relation curve between a distance from a signal line to two sides of a slit and a capacitance of the signal line of the array substrate in FIG. 4.

A relationship between the capacitance C and the average distances D2, D4 is illustrated in FIG. 6. A sum of the average distance D2 and the average distance D3 is fixed to 6.25 μm, and a sum of the average distance D4 and the average distance D5 is also fixed to 6.25 μm. The capacitance C represents a capacitance between the signal line 320 or the signal line 340 and its corresponding common electrode.

As can be seen from FIG. 6, there is a relationship between the signal line (the signal line 320 or the signal line 340) and its corresponding slit (the slit 3110 or the slit 3310). The closer the projection approaches to two sides of the slit, the greater the capacitance between the signal line and its corresponding common electrode is. Namely, the closer the signal line approaches to the middle position of the slit, the smaller the capacitance between the signal line and its corresponding common electrode is.

In other words, as shown in FIG. 5, the greater the difference between the average distance D2 and the average distance D3, the greater the capacitance between the signal line and its corresponding common electrode. The less the difference between the average distance D2 and the average distance D3, the less the capacitance between the signal line and its corresponding common electrode. Similarly, the greater the difference between the average distance D4 and the average distance D5, the greater the capacitance between the signal line and its corresponding common electrode. The less the difference between the average distance D4 and the average distance D5, the less the capacitance between the signal line and its corresponding common electrode.

It can be seen that, when the resistance of the signal line 320 is greater than the resistance of the signal line 340, the difference between the average distance D4 and the average distance D5 is configured to be greater than the difference between the average distance D2 and the average distance D3 (as shown in FIG. 5), so that a difference between the RC of the signal line 320 and the RC of the signal line 340 can be reduced.

In one embodiment, every signal line has a resistance itself, and has a capacitance with the common electrodes insulated from it. RC represents a product of the resistance and the capacitance. A ratio of the maximal RC to the minimal RC of the plurality of signal lines ranges from 1 to 1.2.

For example, as shown in FIG. 4 and FIG. 5, a ratio of the RC of the signal line 320 to the RC of the signal line 340 ranges from 1 to 1.2. By setting the ratio of the maximal RC to the minimal RC of the plurality of signal lines in a range from 1 to 1.2, the RC difference in this embodiment can be controlled in a desired level, so as to improve the electric performance of the array substrate.

It should be noted that, in other embodiments, the plurality of common electrodes are arranged in an array having M rows and N columns, wherein both M and N are an integer greater than 1. A common electrode in the mth row and the $n^{th}$ column is referred to as a $(m \times n)^{th}$ common electrode, and is electrically connected to a $(m \times n)^{th}$ signal line, wherein m is an integer ranging from 1 to M−1, and n is an integer ranging from 1 to N. There are slits in parts of the common electrodes from $((m+1) \times n^{th}$ to $M^{th}$ facing to the $(m \times n)^{th}$ signal line. The $(m \times n)^{th}$ signal line has a (m×n)th resistance itself, and there is a $(m \times n)^{th}$ capacitance between the $(m \times n)^{th}$ signal line and the common electrodes from $((m+1) \times x^{th}$ to $M^{th}$. $RC_{(m \times n)}$ represents a product of the $(m \times n)^{th}$ resistance and the $(m \times n)^{th}$ capacitance. A ratio of the maximal vale to the minimal value of the RCs from $RC_{(1 \times 1)}$ to $RC_{(M-1) \times N)}$ ranges from 1 to 1.2.

In other embodiments of the present disclosure, another array substrate is provided. The arrays substrate includes a plurality of common electrodes, which are insulated from each other. The array substrate further includes a plurality of signal lines. Each of the plurality of common electrodes is electrically connected with one end of one of the plurality of signal lines, and the other end of the signal line is electrically connected with a driving chip (referring to FIG. 1).

In one embodiment, the signal line is insulated from other common electrodes which are not electrically connected with it. The common electrode has a slit in a part facing to the signal line which is insulated from it. Each common electrode is electrically connected with one end of one of the plurality of signal lines, and is insulated from other touch signal lines. If one signal line is not electrically connected with one common electrode and the common electrode has a part facing to the signal line, the part of the common electrode facing to the signal line has a slit.

In an embodiment, the common electrodes serve as display electrodes in a display period, or as self-capacitance touch electrode in a touch detection period. When a display panel having the array substrate works in a display period, a common voltage is applied to all the common electrodes; and when the display panel having the array substrate works in a touch period, the common electrodes work as self-capacitance electrodes and voltages for touch detection are applied to the common electrodes.

In one embodiment, the plurality of common electrodes are arranged in an array having M rows and N columns, wherein both M and N are integers greater than 1. For the M common electrodes in a same column, a $k^{th}$ common electrode is electrically connected with a $k^{th}$ signal line, wherein k is an integer between 1 and M.

Figure 7:
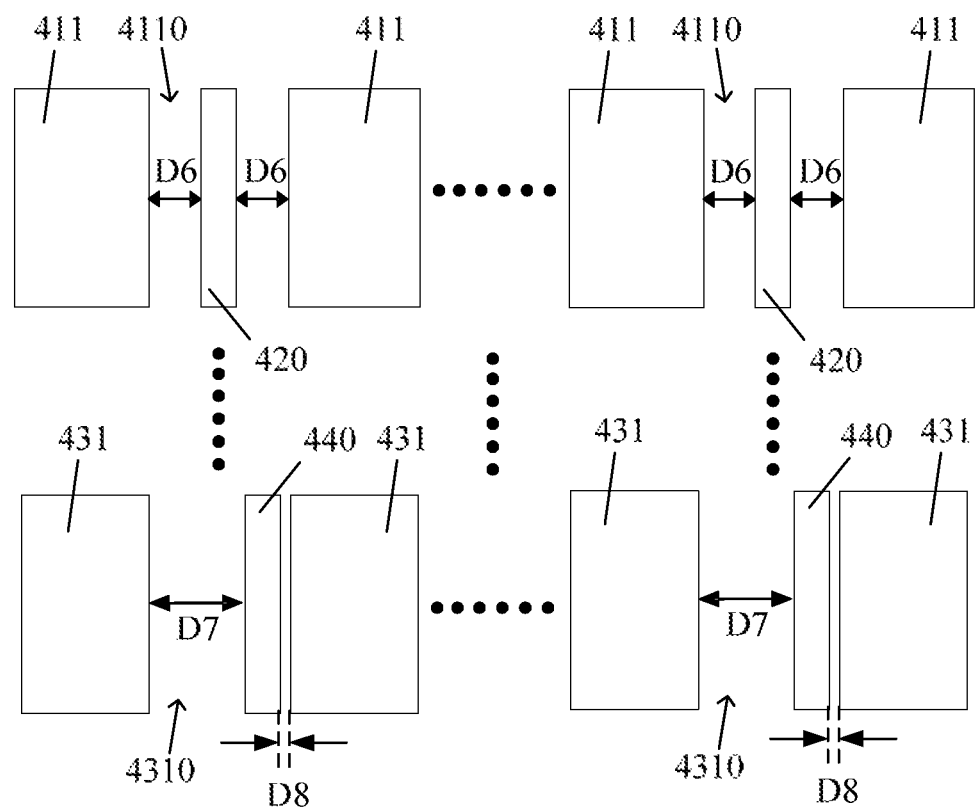
FIG. 7 schematically illustrates a diagram of an array substrate according to another embodiment of the present disclosure.

Referring to FIG. 7, a part of an array substrate of this embodiment is illustrated. FIG. 7 illustrates a plurality of common electrodes arranged in an array. Specifically, the plurality of common electrodes includes a common electrode 411 in the second row. It should be noted that, the common electrodes in the first row of the array are not illustrated in FIG. 7. FIG. 7 also illustrates signal lines 420 connecting the common electrodes in the first row. The common electrode 411 is insulated from the signal line 420. Therefore, as shown in FIG. 7, a part of the common electrode 411 facing to the signal line 420 has a slit 4110.

FIG. 7 also illustrates a second plurality of common electrodes arranged in an array, which includes a common electrode 431 in the $M^{th}$ row. Meanwhile, a signal line 440 is illustrated, and the signal line 440 is electrically connected with common electrodes (not shown) in the $(M-1)^{th}$ row. The common electrode 431 is illustrated from the signal line 440. Therefore, as shown in FIG. 7, a part of the common electrode 430 facing to the signal line 440 has a slit 4310.

It should be noted that, the signal line 420 and the signal line 440 shown in FIG. 7 are projections in the plane of the common electrodes. Although the common electrode and the signal line are electrically connected, they are in different layers. Specifically, an insulator layer (not shown) is disposed between the common electrodes and the signal line. The insulator layer provides good insulation efficiency between the common electrodes and the signal line. The signal lines are electrically connected with the common electrodes through via holes in the insulator layer.

In one embodiment, average distances from the signal line electrically connected with the common electrodes in the first row to two sides of the slit are substantially equal. As shown in FIG. 7, average distances from the signal line to two sides of the slit 4110 are substantially equal. In this case, according to descriptions of above embodiments and FIG. 6, the capacitance between the signal line 420 and the common electrode has a minimum value. Because the signal line 420 is electrically connected with the common electrodes in the first row, the signal line 420 has a greatest length. That is, the signal line 420 has a greatest resistance. By controlling the average distance D6, the signal line 420 having the greatest resistance can obtain a minimum capacitance, so that a RC difference between the signal line 420 and other signal lines can be reduced.

In an embodiment, compared with connecting with other common electrodes in a same column, the signal line connecting with the common electrode of the (M-1) row has a greatest difference between average distances from the signal line to two sides of the slit. As shown in FIG. 7, a difference of an average distance D7 and an average distance D8 from the signal line 440 to two sides of the slit 4310 has a greatest value. In this case, according to descriptions of above embodiments and FIG. 6, the capacitance between the signal line 440 and the common electrode has a greatest value in a column. Because the signal line 440 is electrically connected with the common electrodes in the Mth row (the last row), the signal line 440 has a minimum length in the column, that is, the signal line 440 has a minimum resistance in the column. By controlling the average distances D7 and D8, the signal line 440 having the minimum resistance may obtains a greatest capacitance in the column, so that a RC difference between the signal line 440 and other signal lines in the same column can be reduced, and touch and display performances of the display panel can be improved.

In other embodiments of the present disclosure, another array substrate is provided. The array substrate includes a plurality of common electrodes, which are insulated from each other. The array substrate further includes a plurality of signal lines. Each of the plurality of common electrodes is electrically connected with one end of one of the plurality of signal lines, and the other end of each signal line is electrically connected with a driving chip (referring to FIG. 1).

In an embodiment, the signal line is insulated from other common electrodes which are not electrically connected with it. The common electrode has a slit in a part facing to the signal line which is insulated from it. Each common electrode is electrically connected with one end of one of the plurality of signal lines, and is insulated from other touch signal lines. If one signal line is not electrically connected with one common electrode and the common electrode has a part facing to the signal line, the part of the common electrode facing to the signal line has a slit.

In an embodiment, the common electrodes serve as display electrodes in a display period, and serve as self-capacitance touch electrode in a touch detection period. When a display panel having the array substrate works in a display period, a common voltage is applied to all the common electrodes; and when the display panel having the array substrate works in a touch period, the common electrodes work as self-capacitance electrodes and voltages for touch detection are applied to the common electrodes.

Figure 8:
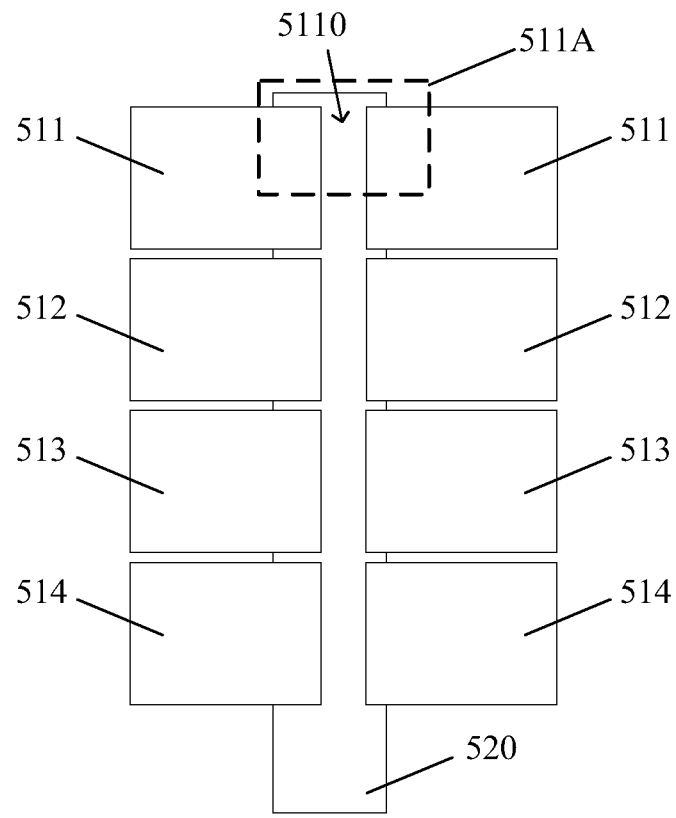
FIG. 8 schematically illustrates a diagram of an array substrate according to another embodiment of the present disclosure.

Referring to FIG. 8, a part of an array substrate of this embodiment is illustrated. A common electrode 511, a common electrode 512, a common electrode 513, a common electrode 514, and a signal line 520 are illustrated in FIG. 8. A common electrode electrically connected with the signal line 520 is not illustrated in FIG. 8. The common electrode 511, the common electrode 512, the common electrode 513 and the common electrode 514 are insulated from the signal line 520. Therefore, as shown in FIG. 8, a part of each of the common electrode 511, the common electrode 512, the common electrode 513 and the common electrode 514, which is facing to the signal line 520, has a slit. The common electrode 511 has a slit 5110, and slits of the common electrodes 511, 512, and 513 are not labeled in FIG. 8.

It should be noted that, the signal line 520 shown in FIG. 8 is a projection in a plane of the common electrodes. The common electrode 511, the common electrode 512, the common electrode 513 and the common electrode 514 are in a different layer from the signal line 520. Specifically, an insulator layer (not shown) is disposed between the common electrodes (511, 512, 513 and 514) and the signal line. The insulator layer provides good insulation between the common electrodes and the signal line.

It should be noted that, each of the common electrodes in FIG. 8 has a left part and a right part on both sides of the slit, and a part for electrically connecting the left part and the right part is not shown. However, the common electrode 511, which is illustrated as a left part and a right part in FIG. 8, is actually electrically connected as a whole. The slit 5110 doesn't separate the entire common electrode 511. For example, the common electrode 511 in FIG. 8 has a part (not shown) for connecting the two parts.

Figure 9:
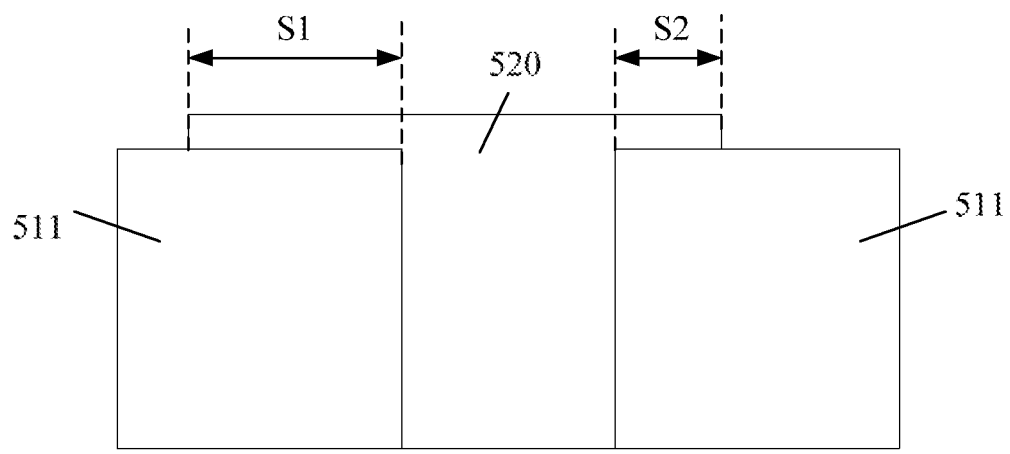
FIG. 9 schematically illustrates a partial enlarged view of the array substrate in FIG. 8.

Referring to FIG. 9, a partial enlarged view of a dashed box 511A shown in FIG. 8 is illustrated. A projection of the signal line 520 is in a plane of the common electrode. The projection of the signal line 520 overlaps a part of the common electrode 511 on both two sides of the slit 5110. An overlap area on one side is S1, and an overlap area on the other side is S2.

In this embodiment, by disposing the signal line 520 at a position far away from or near to the middle position of the slit 5110, the area S1 and the area S2 can be adjusted. Because a sum of the area S1 and the area S2 is a constant value, a plate capacitance formed by the signal line 520 and the common electrode is basically unchanged during adjusting the area S1 and the area S2. However, if the area S1 and the area S2 are adjusted to be the same, average distances from two sides of the signal line 520 to two sides of the slits 5110 is the same. In this case, according to the curve shown in FIG. 6, a fringe capacitance between the signal line 520 and the common electrode has the greatest value. Therefore, by adjusting the area S1 and the area S2, RC of the signal line 520 can be controlled, so that a RC difference between the signal line 520 and other signal lines can be reduced, and touch and display performances of the display panel can be improved.

It should be noted that, in other embodiments, the projection of the signal line in the plane of the common electrodes doesn't overlap the common electrode on two sides of the slit.

Figure 10:
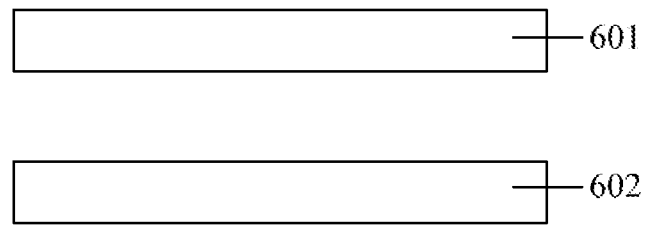
FIG. 10 schematically illustrates a diagram of a display panel according to an embodiment of the present disclosure.

A display panel is also provided in embodiments of the present disclosure. Referring to FIG. 10, the display panel includes a first substrate 601 and a second substrate 602 which are oppositely disposed. The second substrate may be the array substrate provided in above embodiments, so that the structure and the property of the second substrate 602 are described in above embodiments and FIGS. 2-9. In addition, a liquid crystal display layer or an organic light emitting display layer may be disposed between the first substrate 601 and the second substrate 602.

Because the display panel of this embodiment including the array substrate described above, the display panel has both a touch function and a display function. Moreover, because RC differences between different signal lines are small, the detection noise in the touch detection period, and problems such as uneven flicker, residual image, whitening of black image don't appear. Therefore, display performance of the display panel is improved.

Although the present disclosure has been disclosed above with reference to preferred embodiments thereof, it should be understood by those skilled in the art that various changes may be made without departing from the spirit or scope of the disclosure. Accordingly, the present disclosure is not limited to the embodiments disclosed.

What is claimed is:

1. An array substrate, comprising:
a plurality of common electrodes insulated from each other; and
a plurality of signal lines comprising a first signal line and a second signal line, wherein the first and second signal lines are separate and distinct;
wherein the first and second signal lines are electrically connected with a driving chip;
wherein the first signal line is electrically connected with only one of the plurality of common electrodes and is insulated from all others of the plurality of common electrodes, and
wherein the second signal line is electrically connected with only another one of the plurality of common electrodes and is insulated from all others of the plurality of common electrodes;
wherein a first one of the plurality of common electrodes insulated from the first signal line has a first slit in a part facing the first signal line;
wherein a second one of the plurality of common electrodes insulated from the second signal line has a second slit in a part facing the second signal line,
wherein a distance between the driver chip and the common electrode electrically connected with the first signal line is greater than a distance between the driver chip and the common electrode electrically connected with the second signal line;
wherein a first deviation is formed between a width bisector of a projection of the first signal line in a plane of the plurality of common electrodes and a width bisector of the first slit; and
wherein a second deviation is formed between a width bisector of a projection of the second signal line in the plane of the plurality of common electrodes and a width bisector of the second slit, wherein the first deviation is smaller than the second deviation.

2. The array substrate according to claim 1, wherein each of the plurality of common electrodes is electrically connected with at least one of the plurality of signal lines;
wherein the plurality of signal lines is further electrically connected with the driving chip;
wherein each of the plurality of common electrodes has a slit in a part facing each of the plurality of signal lines insulated from it; and
wherein at least one of the plurality of signal lines has a deviation between width bisector of it projection in the plane of the plurality of common electrodes and width bisector of its corresponding slit;
wherein the plurality of signal lines each has a resistance; and
wherein the greater the resistance of said signal line is, the smaller said signal line's corresponding deviation is.

3. The array substrate according to claim 2, wherein the farther one of the plurality of common electrodes is away from the driving chip, the smaller the deviation is between the one to one connected signal line and the common electrode.

4. The array substrate according to claim 1, wherein each of the plurality of signal lines forms a plurality of capacitances with the plurality of common electrodes not connected with it;
wherein a sum of the plurality of capacitances is C and wherein the resistance of one of the plurality of signal lines is R, and each of the plurality of common electrodes forms a RC constant relative to each of the unconnected signal lines; and wherein a ratio of a maximum value to a minimum value of RCs ranges from 1 to 1.2.

5. The array substrate according to claim 2, wherein the plurality of common electrodes are arranged in an array having M rows and N columns, and both M and N are integers greater than 1; and
wherein, for M common electrodes in a same column, a $k^{th}$ common electrode is electrically connected with a $k^{th}$ signal line, the closer the $k^{th}$ common electrode approaches to the driving chip, the greater a difference between two average distances from the $k^{th}$ signal line to two sides of the slit is, and k is an integer between 1 and M.

6. The array substrate according to claim 5, wherein two average distances from the first signal line to two sides of the slit are equal.

7. The array substrate according to claim 5, wherein a difference between two average distances from the $(M-1)^{th}$ signal line to two sides of the slits has a maximum value.

8. The array substrate according to claim 2, wherein the projection of one of the plurality of the signal lines in the plane of the common electrodes overlaps a part of the common electrode on two sides of the slit.

9. The array substrate according to claim 2, wherein the projection of one of the plurality of signal lines in the plane of the common electrodes does not overlap with the common electrode on two sides of the slit.

10. The array substrate according to claim 4, wherein the plurality of common electrodes are arranged in an array having M rows and N columns, and both M and N are integers greater than 1;
   wherein a common electrode in the $m^{th}$ row and the $n^{th}$ column is referred to as a $(m \times n)^{th}$ common electrode, and is electrically connected to a $(m \times n)^{th}$ signal line, where m is an integer ranging from 1 to M−1, and n is an integer ranging from 1 to N;
   wherein there is a slit in a part of each of the common electrodes from $((m+1) \times n)^{th}$ to $M^{th}$ facing to the $(m \times n)^{th}$ signal line, the $(m \times n)^{th}$ signal line has a $(m \times n)^{th}$ resistance itself, there is a $(m \times n)^{th}$ capacitance between the $(m \times n)^{th}$ signal line and the common electrodes from $((m+1) \times n)^{th}$ to $M^{th}$, $RC_{(m \times n)}$ represents a product of the $(m \times n)^{th}$ resistance and the $(m \times n)^{th}$ capacitance, and a ratio of a maximum value to a minimum value of RCs from $RC_{(1 \times 1)}$ to $RC_{((M-1) \times N)}$ ranges from 1 to 1.2.

11. The array substrate according to claim 1, wherein the plurality of common electrodes serves as display electrodes in a display period, or serves as self-capacitance touch electrodes in a touch detection period.

12. A display panel, comprising:
   an array substrate, wherein the array substrate comprises:
      a plurality of common electrodes insulated from each other; and
      a plurality of signal lines comprising a first signal line and a second signal line, wherein the first signal line and second signal line are separate and distinct;
   wherein the first and second signal lines are electrically connected with a driving chip;
   wherein the first signal line is electrically connected with only one of the plurality of common electrodes and is insulated from all others of the plurality of common electrodes, and
   wherein the second signal line is electrically connected with only another one of the plurality of common electrodes and is insulated from all others of the plurality of common electrodes;
   wherein a first one of the plurality of common electrodes insulated from the first signal line has a first slit in a part facing the first signal line;
   wherein a second one of the plurality of common electrodes insulated from the second signal line has a second slit in a part facing the second signal line,
   wherein a distance between the driver chip and the common electrode electrically connected with the first signal line is greater than a distance between the driver chip and the common electrode electrically connected with the second signal line;
   wherein a first deviation is formed between a width bisector of a projection of the first signal line in a plane of the plurality of common electrodes and a width bisector of the first slit; and
   wherein a second deviation is formed between a width bisector of a projection of the second signal line in the plane of the plurality of common electrodes and a width bisector of the second slit, wherein the first deviation is smaller than the second deviation.

* * * * *